(12) United States Patent
Abe et al.

(10) Patent No.: US 8,816,207 B2
(45) Date of Patent: Aug. 26, 2014

(54) COAXIAL CABLE AND MANUFACTURING METHOD OF THE SAME

(75) Inventors: Tomiya Abe, Hitachi (JP); Dai Ishikawa, Hitachi (JP); Masanobu Ito, Hitachi (JP); Tadayoshi Tsuchiya, Ishioka (JP)

(73) Assignee: Hitachi Cable, Ltd., Tokyo (JP)

( * ) Notice: Subject to any disclaimer, the term of this patent is extended or adjusted under 35 U.S.C. 154(b) by 45 days.

(21) Appl. No.: 12/483,719

(22) Filed: Jun. 12, 2009

(65) Prior Publication Data

US 2010/0139943 A1    Jun. 10, 2010

(30) Foreign Application Priority Data

Dec. 5, 2008  (JP) .................................. 2008-310823

(51) Int. Cl.
| | |
|---|---|
| H01B 9/02 | (2006.01) |
| H01B 13/24 | (2006.01) |
| H01B 11/18 | (2006.01) |
| B82Y 30/00 | (2011.01) |
| H01B 3/44 | (2006.01) |
| H01B 13/22 | (2006.01) |

(52) U.S. Cl.
CPC ............ *H01B 11/1817* (2013.01); *H01B 13/24* (2013.01); *B05D 2256/00* (2013.01); *H01B 13/225* (2013.01); *B82Y 30/00* (2013.01); *H01B 3/445* (2013.01)
USPC ......................................................... 174/107

(58) Field of Classification Search
USPC ................. 174/102 SC, 105 R, 107
See application file for complete search history.

(56) References Cited

U.S. PATENT DOCUMENTS

| | | | |
|---|---|---|---|
| 3,748,369 A * | 7/1973 | Durakis et al. .................. 174/36 |
| 4,532,375 A * | 7/1985 | Weitzel et al. ................. 174/107 |
| 7,220,916 B2 * | 5/2007 | Schwamborn et al. ... 174/110 R |
| 7,297,872 B2 | 11/2007 | Morijiri |
| 7,390,970 B2 * | 6/2008 | Lee et al. ................ 174/102 SC |
| 2005/0098344 A1 * | 5/2005 | Ysbrand ................. 174/102 SC |
| 2006/0157267 A1 | 7/2006 | Morijiri |
| 2008/0081139 A1 | 4/2008 | Iwahara et al. |
| 2010/0035375 A1 * | 2/2010 | Grigoropoulos et al. ....... 438/99 |

FOREIGN PATENT DOCUMENTS

| | | |
|---|---|---|
| JP | 06-187847 | 7/1994 |
| JP | 07-018035 | 1/1995 |
| JP | 2006-038999 | 2/2006 |
| JP | 2006100381 A | 4/2006 |
| JP | 2006165467 A | 6/2006 |
| JP | 2006222059 A | 8/2006 |
| JP | 2006-294528 | 10/2006 |
| JP | 2008105401 A | 5/2008 |

OTHER PUBLICATIONS

Machine Translation for JP 2006-294528.*

(Continued)

*Primary Examiner* — Chau N Nguyen
(74) *Attorney, Agent, or Firm* — Fleit Gibbons Gutman Bongini & Bianco PL; Martin Fleit; Paul D. Bianco

(57) ABSTRACT

The invention provides a coaxial cable including an internal insulating layer formed on an outer periphery of an electric conductor, a conductive layer formed on an outer periphery of the internal insulating layer, and an external insulating layer formed on an outer periphery of the conductive layer. The conductive layer is made of a metal nanoparticle paste sintered body obtained by sintering metal nanoparticles by irradiation of light toward a metal nanoparticles paste.

8 Claims, 3 Drawing Sheets

(56) References Cited

OTHER PUBLICATIONS

Choi, Tae Y. et al.: Fountain-Pen-Based Laser Microstructuring With Gold Nanoparticle Inks; Applied Physics Letters, 85, p. 13-15, 2004; American Institute of Physics.

Office Action issued on Feb. 26, 2013 in corresponding Japanese Patent Application No. 2008-310823 (with English translation).

* cited by examiner

COAXIAL CABLE AND MANUFACTURING METHOD OF THE SAME

BACKGROUND

1. Technical Field

The present invention relates to a coaxial cable and a manufacturing method of the same, and particularly relates to a micro-coaxial cable using a metal nanoparticle paste sintered body in a conductive layer, and the manufacturing method of the same.

2. Description of Related Art

In a general coaxial cable, a low permeability insulating layer is formed on an outer periphery of an electric conductor positioned in a center. Further, a conductive layer is formed on an outer periphery of the insulating layer, by winding metal wires or a metal film around the outer periphery of the insulating layer. The conductive layer serves as a shield layer.

Meanwhile, in a method of forming the conductive layer by winding the metal wires or the metal film around the outer periphery of the insulating layer, it is difficult to manufacture a long coaxial cable, with a tendency of further micronizing a cable (for example, see patent document 1).

Here, in order to further micronize the cable, patent document 2 discloses a technique of coating a surface of the insulating layer made of fluororesin with a conductive nanoparticle paste, instead of winding the metal wires or the metal film around the outer periphery of the insulating layer, thereby providing a metal thin film as a shield layer made of a metal nanoparticle sintered body which is obtained by sintering metal nanoparticles by energization heating (for example see patent document 2).

Also, as a related technique, patent document 3 discloses a technique of improving bonding properties by making the fluororesin have various functional groups, and also patent document 4 discloses a technique in which by performing sintering by laser beams instead of sintering by energization heating when current wiring is formed on a substrate, only metal nanoparticles of a wiring part are sintered, and metal nanoparticles of the other part are removed. Further, non-patent document 1 describes a technique of decreasing a sintering temperature in a gold nanoparticle ink, in the sintering by the laser beams.

(Patent document 1)
Japanese Patent Laid Open Publication No. 06-187847
(Patent document 2)
Japanese Patent Laid Open Publication No. 2006-294528
(Patent document 3)
Japanese Patent Laid Open Publication No. 07-18035
(Patent document 4)
Japanese Patent Laid Open Publication No. 2006-38999
(Non-Patent document 1) Tae Y. Choi and Dimos Poulikakos, Applied Physics Letters, 85, p. 13-15,2004

However, there is a problem of easily causing external deformation such as bending to occur, when a force is added to a micro-cable which is formed by decreasing a wire diameter of the cable. Even in a case of a slight external deformation such as bending that occurs in the micro-cable, there is a problem that decline of adhesion occurs between an insulating layer in the cable and a shield layer made of a metal thin film. By such a low adhesion between the insulating layer and the metal thin film, there is also a problem that the metal thin film is peeled off from the insulating layer, thus causing a breakage of the metal thin film. As a result, conductivity of the shield layer, being a conductive layer, becomes insufficient, and shield characteristics are deteriorated.

Note that in order to improve the adhesion of the fluororesin, a method of applying chemical and physical etching to the fluororesin can be taken into consideration. However, this method involves a problem that a working process is complicated, a facility cost is increased, and a waste liquid is generated, thus posing a problem in terms of mass-production.

In the patent document 2, in order to further micronize a cable, the metal thin film made of the metal nanoparticle paste sintered body which is obtained by sintering the metal nanoparticles by energization heating, is formed on the insulating layer. However, when the sintering by energization heating is performed, heat treatment is applied not only to the nanoparticle paste to be sintered but also to the insulating layer, being its underlying layer. When the insulating layer is also heated, there is a possibility that decline of adhesion occurs between the insulating layer and the metal thin film, due to deformation and change of quality of the insulating layer. Therefore, even in a case of a slight external deformation such as bending that occurs in the micro-cable, there is a possibility that the metal thin film is peeled off from the insulating layer, thus causing the breakage of the metal thin film. As a result, there is a possibility that conductivity of the shield layer, being the conductive layer, becomes insufficient, and the shield characteristics are deteriorated.

SUMMARY OF THE INVENTION

A first aspect of the present invention provides a coaxial cable, including:
an internal insulating layer formed on an outer periphery of an electric conductor; and
a conductive layer formed on an outer periphery of the internal insulating layer,
wherein the conductive layer is made of a metal nanoparticle paste sintered body obtained by sintering metal nanoparticles by irradiation of light toward a metal nanoparticle paste, and an external insulating layer is formed on an outer periphery of the conductive layer.

Another aspect of the present invention provides a manufacturing method of a coaxial cable, including the steps of:
forming a first internal insulating layer, in which a tetrafluoroethylene-perfluoroalkylvinyl ether copolymer is used, on an outer periphery of an electric conductor;
forming a second internal insulating layer, in which a fluorine-containing polymer, with a compound of one kind or more selected from unsaturated carboxylic acid and ester thereof grafted onto the tetrafluoroethylene-perfluoroalkylvinyl ether copolymer is used, on an outer periphery of the first internal insulating layer;
forming a conductive layer on an outer periphery of the second internal insulating layer, by sintering metal nanoparticles by irradiation of light toward a silver or a copper nanoparticle paste which is applied on an outer periphery of the second internal insulating layer; and
forming an external insulating layer, in which a tetrafluoroethylene-perfluoroalkylvinyl ether copolymer is used, on an outer periphery of the conductive layer.

According to the present invention, the micro-coaxial cable having a resistance to deformation, can be obtained.

BEST MODE FOR CARRYING OUT THE INVENTION

First Embodiment

Figure 1:
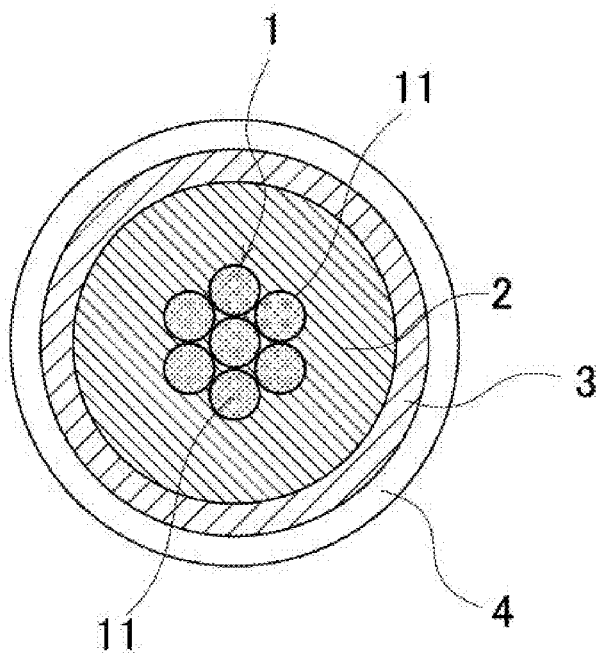
FIG. 1 is a sectional view of a coaxial cable according to an embodiment of the present invention.

FIG. 1 shows a sectional structure of an embodiment of a coaxial cable of the present invention. As shown in FIG. 1, in the coaxial cable, an internal insulating layer 2 is formed on an outer periphery of an electric conductor 1, and a conductive layer 3 is formed on an outer periphery of the internal insulating layer 2, and further an external insulating layer 4 is formed on an outer periphery of the conductive layer 3.

First, the electric conductor 1 is composed of long central twisted conductors 11 with cross-sectional face formed into round shapes (also called core wires 11 hereinafter). Metal is used in the central conductors 11, and for example a copper alloy is used. The central conductors 11 may be made of, for example, a single copper wire or a plurality of twisted wires or braided wires, and hot dip plating or tin plating by electrolytic conversion treatment may be applied to the copper wire.

Although as an insulating layer, resin of a low dielectric constant is used in the internal insulating layer 2, preferably a tetrafluoroethylene-perfluoroalkylvinyl ether copolymer (called PFA hereinafter) is used. This is because the PFA has excellent durability and electric characteristics.

It is further preferable to use a fluorine-containing polymer, with the PFA grafted with a compound of one kind or more selected from unsaturated carboxylic acid and ester thereof (also called a grafted PFA). This is because excellent adhesion is achieved between the grafted PFA and other resin or metal, compared with the PFA. As a result, strength of the conductive layer 3 can be ensured, by making a tight adhesion between the grafted PFA and a metal nanoparticle paste sintered body as will be described later in detail.

As a method of grafting the PFA with the compound of one kind or more selected from the unsaturated carboxylic acid and the ester thereof, it is possible to use a method of making both of them reacted with each other in the presence of a radical initiator, and a method of copolymerizing the PFA when it is polymerized. Such a grafting reaction may be caused in a state of a solution using an organic solvent, etc, and also may be caused in a molten state in an extruder.

Note that additives such as a flame-retardant agent, an antioxidant, a lubricant, a surface-active agent, a softener, a plasticizer, an inorganic filler, a compatibilizing agent, a stabilizer, a cross-linking agent, a foaming agent, an ultraviolet absorber, a light stabilizer, a colorant, a filler, and a stiffener, can be added to the internal insulating layer 2 as needed.

Next, the conductive layer 3 formed on the outer periphery of the internal insulating layer 2 is formed by the metal nanoparticle paste sintered body obtained by coating the internal insulating layer 2 with the metal nanoparticle paste and sintering the metal nanoparticle paste by irradiation of light.

The metal nanoparticle paste is set in a state that metal nanoparticles of a nano order are dispersed in a solvent (such as decanol).

The metal nanoparticles must be nanoparticles exhibiting conductivity after sintering, and metals such as gold, silver, copper, nickel, and platinum, or an alloy containing such metals can be given as examples of constituting the metal nanoparticles. However, preferably the metal nanoparticles contain copper or silver. This is because conductivity is excellent in this case.

Also, preferably each metal nanoparticle has an average particle size of 100 nm or less. This is because when the internal insulating layer 2 is coated with the metal nanoparticle paste containing the metal nanoparticles with each particle size exceeding 100 nm or constituting an aggregate particles having a size exceeding 100 nm, irregularities or unevenness is easily generated on a coated film, by the presence of a particle having a size of 100 nm or more in the coated film, when the internal insulating layer 2 is coated with a film such as having a thickness of about 5 μm, thus making it difficult to form an excellent conductive thin film.

Note that the average particle size means an average size obtained from a particle size distribution of a particle size measured by a transmission electron microscope, and the average particle size means a particle size of an integrated value 50% obtained by integrating the particle size distribution from a small particle size side.

The metal nanoparticle paste, with the metal nanoparticles dispersed in the solvent, is preferably set in a state between a paste and a liquid, so as to be suitable for coating, and viscosity is adjusted by increasing/decreasing an amount of the solvent as needed.

In addition, in order to improve dispersability and coating uniformity of the metal nanoparticles in the solvent, preferably surfaces of metal nanoparticles are covered with a suitable organic aggregation preventive layer such as a surface-active agent. For example, preferably surfaces of the metal nanoparticles are covered with a dispersant containing fatty amine. This is because nanoparticles generally have active surfaces and an aggregate is thereby easily formed, and as a result, irregularities or unevenness caused by the aggregate having a size more than micron order is easily generated in a coating step. Therefore, by covering the metal nanoparticles with the organic aggregation preventive layer, it is possible to prevent the metal nanoparticles in the metal nanoparticle paste from bonding with one another and aggregating. Thus, the metal nanoparticles are easily dispersed uniformly in the metal nanoparticle paste, and variation of a coating thickness of the metal nanoparticle paste due to aggregation can be reduced. Therefore the conductive layer 3 having a uniform thickness can be formed on the outer periphery of the internal insulating layer 2.

After coating the outer periphery of the internal insulating layer 2 with the metal nanoparticle paste, not sintering by heating using an electric furnace used in electric wires and cables conventionally, but sintering by irradiation of light is performed in this embodiment.

The light emitted from a light source during irradiation must have a wavelength that can be absorbed by the metal nanoparticles, and desirably is a laser beam having a wavelength of 1 μm or less. Note that in a case of irradiation of the laser beam having a wavelength exceeding 1 μm, much heat is absorbed by a material of the underlying layer, while less heat is added to the metal nanoparticles, and therefore thermal damage is added to the material of the underlying layer.

By irradiation of light as described above, the conductive layer 3 made of the metal nanoparticle paste sintered body obtained by sintering nanoparticles by irradiation of light, is formed on the outer periphery of the internal insulating layer 2. The conductive layer 3 serves as a shield layer in the coaxial cable of this embodiment.

By forming the conductive layer 3 by sintering metal nanoparticles by irradiation of light, the following effect can be exhibited.

Conventionally, when a long cable is sintered, much labor is required in the sintering of metal nanoparticles by energization heating. However, by the irradiation of light, a sintering process can be expedited even in a case of the long cable.

By the irradiation of light, only a required part can be sintered by collecting lights using a mirror or a lens. In addition, sintering can be adjusted to be strong or weak by a light-collecting degree or by adjusting power of light.

Thus, only a part irradiated with energy can be focused to be sintered. This makes it possible to heat only the metal nanoparticles in the metal nanoparticle paste. Thus, the metal nanoparticle paste can be sintered, with extra heat hardly transmitted to the material of the underlying layer such as the internal insulating layer 2, and less damage added to the material of the underlying layer.

Further, adhesion between the internal insulating layer 2 and the conductive layer 3 can be improved, in combination with heat treatment as needed.

Next, the external insulating layer 4 is formed on the outer periphery of the conductive layer 3.

The PFA is preferably used as the external insulating layer 4, in terms of peelability, low dielectric constant characteristics, and moldability.

Figure 2:
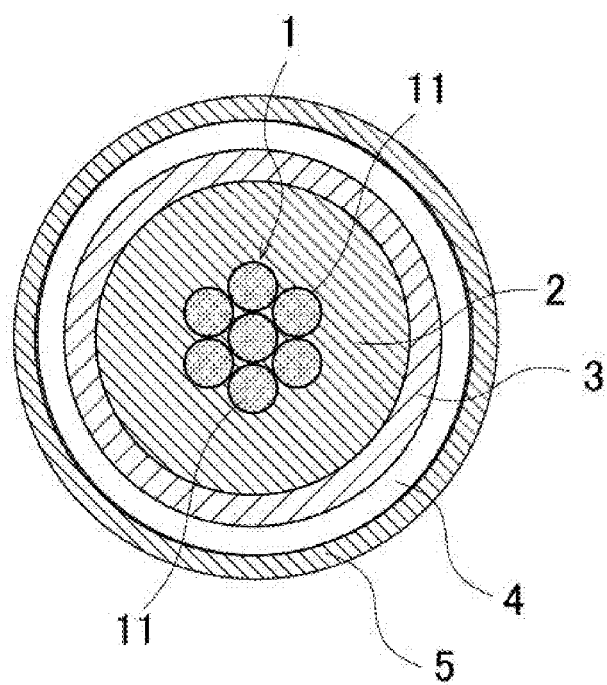
FIG. 2 is a sectional view of the coaxial cable according to other embodiment of the present invention.

Also, as shown in FIG. 2, an outer skin 5 may be formed on the outer periphery of the outer insulating layer 4, so as not to prevent further micronization of the coaxial cable. This is because the coaxial cable having a resistance to deformation can be obtained. Resins such as PFA, polyethylene, and polypropylene having low dielectric constants can be used in the outer skin.

For example, a manufacture of the coaxial cable according to the first embodiment includes the steps of: melting the grafted PFA and the other additives by using a normal extrusion line; and extruding a resin composition containing the grafted PFA into the electric conductor 1 composed of a singular or a plurality of core wires 11. For example, a twin screw extruder is used in the extrusion line. By this twin screw extruder, a molten resin composition is extruded, and the electric conductor 1 is coated with the resin composition containing the PFA to thereby form the internal insulating layer 2.

Thereafter, the internal insulating layer 2 is coated with the metal nanoparticle paste. Coating means is not particularly limited here, and a spray coater, a shower coater, a dye coater, a bar coater, a roll coater, a gravure coater, and screen printing, etc, can be used according to coating conditions.

Here, the metal nanoparticle paste is sintered by irradiation of laser beam, and the conductive layer 3 made of the metal nanoparticle paste sintered body is formed on the outer periphery of the internal insulating layer 2.

Finally, the resin composition added with the PFA and the other additives, is molten to thereby form the external insulating layer 4 on the outer periphery of the conductive layer 3, by using the normal extrusion line.

According to this embodiment, the following effect can be exhibited.

Namely, by irradiation of laser beams, it is possible to improve a bonding strength between the internal insulating layer 2, in which the grafted PFA enriched with bonding properties is used, and the conductive layer 3 as the metal nanoparticle paste sintered body, without damage such as causing deformation and change of quality of the internal insulating layer 2.

Further, even if the external deformation such as bending occurs in the micro-cable, the metal thin film is hardly peeled off from the internal insulating layer 2, because the adhesion between the internal insulating layer 2 in the cable and the conductive layer 3 made of the metal thin film is improved. This makes it possible to reduce a possibility of a breakage of the metal thin film.

Namely, sufficient conduction can be made in the shield layer, being the conductive layer 3, and the micro-cable capable of suppressing decline of the shield characteristics can be obtained.

As a result, according to this embodiment, it is possible to obtain the coaxial cable excellent in mass-production, capable of sufficiently responding to further micronization of the cable, and useful industrially.

The coaxial cable is suitably used in indoor wiring for wireless communication, a cellular phone, internal wiring of a personal computer, internal wiring of electronic equipment, a LAN cable, and electric wire for a sensor such as medical ultrasonic probe cables.

Second Embodiment

Figure 3:
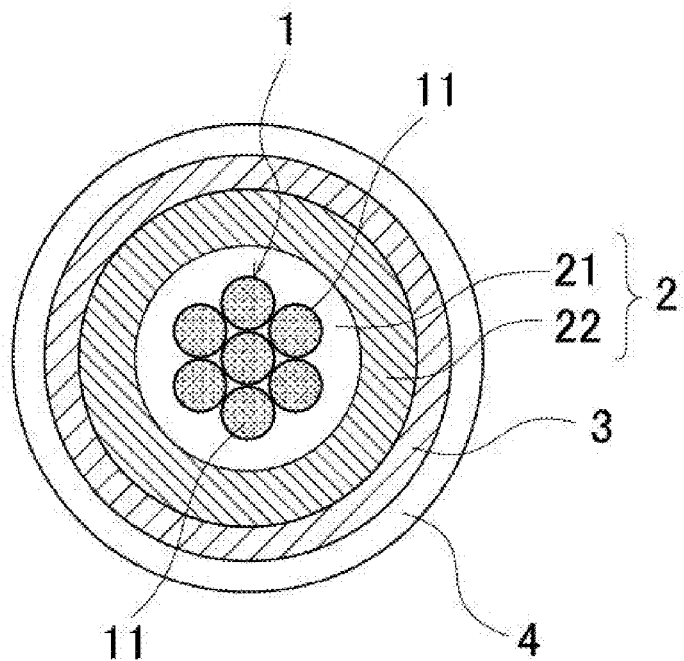
FIG. 3 is a sectional view of the coaxial cable according to other embodiment of the present invention.

FIG. 3 shows a cross-sectional structure of another embodiment of the coaxial cable. A different point from the first embodiment is that the internal insulating layer 2 formed on the outer periphery of the electric conductor 1 has a two-layer structure. Namely, in the internal insulating layer 2 formed on the outer periphery of the electric conductor 1, PFA having low adhesion compared with adhesion of the grafted PFA is used in an inner layer (also called a first internal insulating layer 21 hereinafter), and a grafted PFA having relatively high adhesion is used in an outer layer (also called a second internal insulating layer 22 hereinafter) formed on the outer periphery of the inner layer.

By manufacturing such a coaxial cable, the coaxial cable capable of responding to the following case can be obtained. Namely, when the adhesion between the internal insulating layer 2 and the conductive layer 3 is desired, although the adhesion between the core wires 11 of the electric conductor 1 and the internal insulating layer 2 is not desired, it is possible to obtain the coaxial cable having both the adhesion between the internal insulating layer 2, in which the grafted PFA enriched with bonding properties is used, and the conductive layer 2, being the metal nanoparticle paste sintered body, and peelability of the core wires 11 from the internal insulating layer 2.

Third Embodiment

Figure 4:
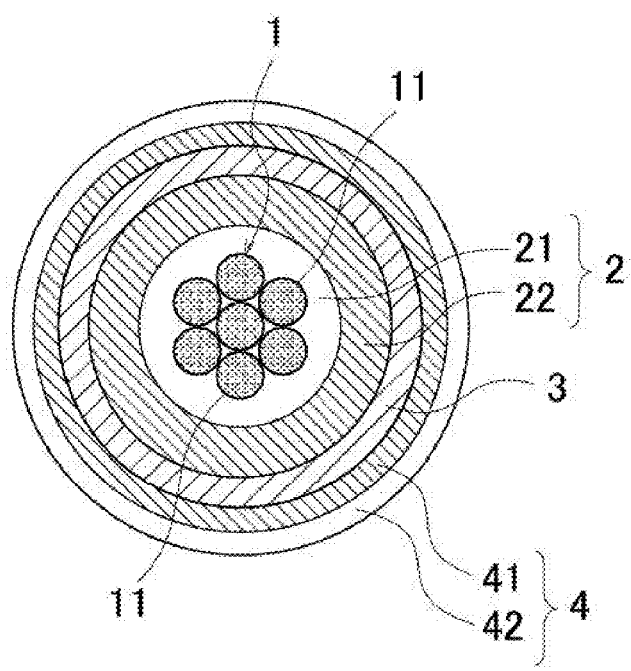
FIG. 4 is a sectional view of the coaxial cable according to other embodiment of the present invention.

FIG. 4 shows a cross-sectional structure of another embodiment of the coaxial cable of the present invention.

Different points from the first embodiment are that the internal insulating layer 2 formed on the outer periphery of the electric conductor 1 has a two-layer structure, and the external insulating layer 4 formed on the outer periphery of the conductive layer 3 has a two-layer structure. Namely, in the external insulating layer 4 formed on the outer periphery of the conductive layer 3, the grafted PFA having relatively high adhesion is used in an inner layer (also called a first external insulating layer 41 hereinafter), and the PFA having lower adhesion than the adhesion of the grafted PFA is used in an outer layer (also called a second external insulating layer 42).

By manufacturing the aforementioned coaxial cable, the following effect can be obtained.

Namely, by sandwiching the conductive layer 3, being the metal nanoparticle paste sintered body, between the second internal insulating layer 22 and the first external insulating 1 layer 41 in which the grafted PFA enriched with bonding properties is used, it is possible to further improve the adhesion between the internal insulating layer 2 in which the grafted PFA enriched with bonding properties is used, and the conductive layer 3, being the metal nanoparticle paste sintered body. In addition, the possibility of the breakage of the metal thin film, being the conductive layer 3, can be further reduced.

EXAMPLES

Next, examples of the present invention will be described.

Example 1

FIG. 1 is a sectional view of the coaxial cable of this example.

First, the electric conductor 1 (having 0.048 mm diameter) was formed by the core wires 11, being seven twisted copper alloy wires having 16 μm diameter.

Next, the outer periphery of the electric conductor 1 was extrusion-coated with the grafted PFA by using a molten extruder, to thereby form the internal insulating layer 2 having 60 μm thickness, with a temperature of resin set at 350° C.

Further, by using a coating die, the outer periphery of the internal insulating layer 2 was coated with a silver nanoparticle paste containing dodecyl amine as a reducing agent, with each particle having an average particle size of 10 nm.

Then, by irradiating the silver nanoparticle paste with Nd:YAG laser beams having 532 nm wavelength, with an output of the light source set at 10 mW, the conductive layer 3 having 7 μm thickness was formed from the silver nanoparticle paste sintered body.

Finally, the outer periphery of the conductive layer 3 was extrusion-coated with PFA by using the molten extruder, to thereby form the external insulating layer 4 having 20 μm thickness, with the temperature of resin set at 350° C., and the manufacture of the coaxial cable was completed.

Note that Fluon P-62XPT by Asahi Glass CO., was used as the PFA.

Also, the fluorine-containing polymer grafted with carboxylic acid anhydride was used in the Fluon P-62XPT by Asahi Glass CO. Steps same as the aforementioned steps are also performed in the examples and comparative examples described below.

Even if the coaxial cable manufactured as described above was used, in a state of being wound ten times, with winding radius set at R5(5 mm), the conductive layer 3 exhibited a function as the shield layer, and this coaxial cable had excellent electric characteristics.

Example 2

This example will be described by using FIG. 1, in the same way as the example 1.

First, the electric conductor 1 (having 0.048 mm diameter) was formed by the core wires 11, being seven twisted copper alloy wires having 16 μm diameter.

Next, the outer periphery of the electric conductor 1 was extrusion-coated with the grafted PFA by using the molten extruder, to thereby form the internal insulating layer 2 having a thickness of 60 μm, with a temperature of resin set at 350° C.

Further, by using the coating die, the outer periphery of the internal insulating layer 2 was coated with a copper nanoparticle paste containing dodecyl amine as the reducing agent, with each particle having an average particle size of 10 nm in this embodiment, although the silver nanoparticle paste was used on the outer periphery of the internal insulating layer 2 in the example 1.

Then, by irradiating the copper nanoparticle paste with Nd:YAG laser beams having a wavelength of 532 nm, with an output of the light source set at 10 mW, the conductive layer 3 having 7 μm thickness was formed from the copper nanoparticle paste sintered body.

Finally, the outer periphery of the conductive layer 3 was extrusion-coated with PFA by using the molten extruder, to thereby form the external insulating layer 4 having 20 μm thickness, with the temperature of resin set at 350° C., and the manufacture of the coaxial cable was completed.

Even if the coaxial cable manufactured as described above was used in a state of being wound ten times, with winding radius set at (R5) 5 mm, the conductive layer 3 exhibited a function as the shield layer, and this coaxial cable had excellent electric characteristics.

Example 3

FIG. 3 is a sectional view of the coaxial cable of this example.

First, the electric conductor 1 (having 0.048 mm diameter) was formed by the core wires 11, being seven twisted copper alloy wires having 16 μm diameter.

Here, in the example 3, the outer periphery of the electric conductor 1 was extrusion-coated with PFA by using the molten extruder, to thereby form the first internal insulating layer 21 having 30 μm thickness, with a temperature of resin set at 350° C.

Further, the outer periphery of the first internal insulating layer 21 was extrusion-coated with the grafted PFA by using the molten extruder, to thereby form the second internal insulating layer 22 having 30 μm thickness, with the temperature of resin set at 350° C.

Next, by using the coating die, the outer periphery of the internal insulating layer 2 was coated with the copper nanoparticle paste containing dodecyl amine as a reducing agent, with each particle having an average particle size of 20 nm.

Then, the copper nanoparticle paste was irradiated with the Nd:YAG laser beams having 532 nm wavelength, with the output of the light source set at 10 mW.

Further, in the example 3, heat treatment was applied to the copper nanoparticle paste, for 10 seconds at 290° C. in an electric furnace, in addition to the irradiation of the laser beams.

Thus, the conductive layer 3 having 7 μm thickness made of the copper nanoparticle paste sintered body was formed.

Finally, the outer periphery of the conductive layer 3 was extrusion-coated with PFA by using the molten extruder, to thereby form the external insulating layer 4 having 20 μm thickness, with the temperature of resin set at 350° C., and the manufacture of the coaxial cable was completed.

Even if the coaxial cable is wound 10 times, with winding radius set at (R5) 5 mm, the conductive layer 3 exhibited the function as the shield layer, and the coaxial cable had excellent electric characteristics.

Comparative Example 1

Figure 5:
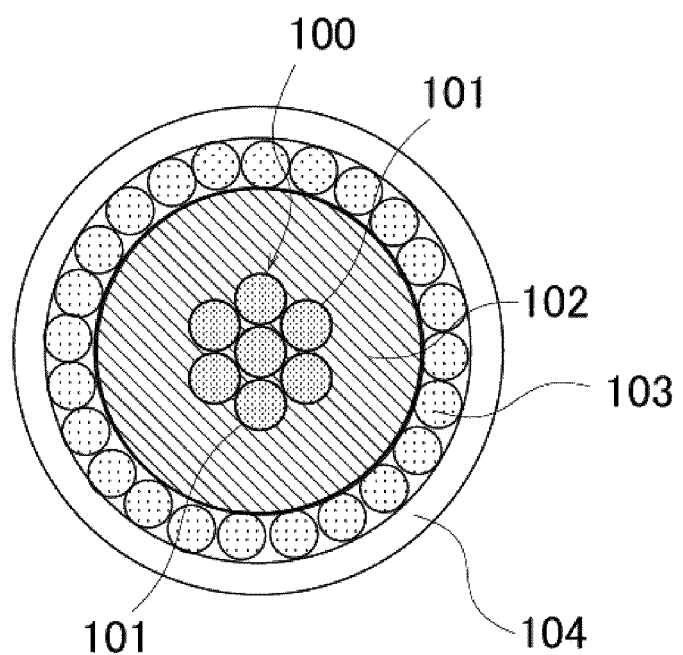
FIG. 5 is a sectional view of the coaxial cable according to a comparative example.

FIG. 5 is a sectional view of the coaxial cable according to a comparative example.

First, the electric conductor 100 (having 0.048 mm diameter) was formed by the core wires 101, being seven twisted copper alloy wires having 16 μm diameter.

Next, the outer periphery of the electric conductor 100 was extrusion-coated with PFA by using the molten extruder, to thereby form an internal insulating layer 102 having 60 μm thickness, with the temperature of resin set at 350° C.

Further, wires, being copper alloy wires having 16 μm diameter, were densely wound (horizontally wound) around the outer periphery of the internal insulating layer 102, to thereby form a conductive layer 103.

Finally, the outer periphery of the conductive layer 103 was extrusion-coated with PFA by using the molten extruder, to thereby form an external insulating layer 104 having 20 μm thickness, with the temperature of resin set at 350° C., and the manufacture of the coaxial cable was completed.

In the manufacture of the coaxial cable, much labor is required compared with examples 1 to 3, because a horizontally winding process is added. Further, as a result of winding the coaxial cable 10 times, with winding radius set at (R5) 5 mm, the function of the conductive layer 103 as the shield layer is deteriorated, compared with the examples 1 to 3, and the electric characteristics are also deteriorated.

What is claimed is:

1. A method for manufacturing a coaxial cable, comprising:
    forming a first internal insulating layer on an outer periphery of an electric conductor, the first internal insulating layer including a tetrafluoroethylene-perfluoroalkylvinyl ether copolymer;
    forming a second internal insulating layer on an outer periphery of the first internal insulating layer, the second internal insulating layer including a fluorine-containing polymer in which a compound of one kind or more selected from an unsaturated carboxylic acid and an ester thereof is grafted onto a tetrafluoroethylene-perfluoroalkylvinyl ether copolymer;
    forming a conductive layer on an outer periphery of the second internal insulating layer, by applying the metal nanoparticle paste on an outer periphery of the second internal insulating layer, the paste consisting of solvent and silver or copper nanoparticles dispersed in the solvent, and sintering the silver or copper nanoparticles by irradiating the metal nanoparticle paste, with a laser beam having a wavelength which is 1 μm or less and which is easily absorbed by the silver or copper nanoparticles, from a laser as a light source, while volatilizing the solvent; and
    forming an external insulating layer on an outer periphery of the conductive layer, the external insulating layer including a tetrafluoroethylene-perfluoroalkylvinyl ether copolymer.

2. A manufacturing method of a coaxial cable comprising:
    forming a first internal insulating layer including a tetrafluoroethylene-perfluoroalkylvinyl ether copolymer, on an outer periphery of an electric conductor;
    forming a second internal insulating layer on an outer periphery of the first internal insulating layer, the second internal insulating layer including a fluorine-containing polymer in which a compound of one kind or more selected from an unsaturated carboxylic acid and an ester thereof is grafted onto a tetrafluoroethylene-perfluoroalkylvinyl ether copolymer;
    applying a metal nanoparticles paste consisting of solvent and metal nanoparticles dispersed in the solvent on an outer periphery of the second internal insulating layer;
    forming a conductive layer on an outer periphery of the second internal insulating layer, by irradiating the metal nanoparticle paste applied on the outer periphery of the internal insulating layer, with a laser beam having a wavelength which is 1 μm or less and which is easily absorbed by the metal nanoparticles, from a laser as a light source, while volatilizing the solvent; and
    forming an external insulating layer on the outer periphery of the conductive layer.

3. The method according to claim 2, wherein the metal nanoparticles of the metal nanoparticle paste are silver particles or copper particles, each of said metal nanoparticles having an average particle size of 100 nm or less.

4. The method according to claim 2, wherein a Nd:YAG laser capable of emitting the laser beam having a wavelength of 532 nm, is used as the laser.

5. The method according to claim 2, wherein the external insulating layer includes a tetrafluoroethylene-perfluoroalkylvinyl ether copolymer.

6. The method according to claim 2, wherein:
    the metal nanoparticles in the metal nanoparticle paste are silver particles or copper particles, each of the metal nanoparticles having an average particle size of 100 nm or less;
    and
    the external insulating layer includes a tetrafluoroethylene-perfluoroalkylvinyl ether copolymer.

7. The method according to claim 2, wherein a Nd:YAG laser is used as the laser.

8. The method according to claim 2, wherein the wavelength of the laser beam is 1 μm or less and 532 nm or more.

* * * * *